(12) United States Patent
Lin et al.

(10) Patent No.: US 10,429,993 B2
(45) Date of Patent: Oct. 1, 2019

(54) TOUCH DISPLAY DRIVING INTEGRATED CIRCUIT AND OPERATION METHOD THEREOF

(71) Applicant: Samsung Electronics Co., Ltd., Suwon-si, Gyeonggi-do (KR)

(72) Inventors: Chia Ching Lin, Zhubei (TW); Jaeyoon Kim, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 15/860,007

(22) Filed: Jan. 2, 2018

(65) Prior Publication Data

US 2018/0275827 A1    Sep. 27, 2018

(30) Foreign Application Priority Data

Mar. 24, 2017 (KR) .................. 10-2017-0037807

(51) Int. Cl.
| | |
|---|---|
| *G06F 3/041* | (2006.01) |
| *G06F 3/044* | (2006.01) |
| *G09G 3/36* | (2006.01) |
| *G02F 1/1333* | (2006.01) |
| *G06F 1/3234* | (2019.01) |

(52) U.S. Cl.
CPC ........ *G06F 3/0418* (2013.01); *G02F 1/13338* (2013.01); *G06F 1/3262* (2013.01); *G06F 3/044* (2013.01); *G06F 3/0412* (2013.01); *G06F 3/0416* (2013.01); *G09G 3/3648* (2013.01); *G06F 2203/04104* (2013.01); *G09G 2310/08* (2013.01); *G09G 2330/021* (2013.01); *G09G 2330/023* (2013.01)

(58) Field of Classification Search
CPC ...... G06F 3/044; G06F 3/0416; G06F 3/0412; G06F 2203/04104; G06F 3/0488; G06F 3/041; G06F 3/0418; G09G 3/3674
See application file for complete search history.

(56) References Cited

U.S. PATENT DOCUMENTS

| | | | |
|---|---|---|---|
| 8,451,244 B2 | 5/2013 | Hotelling et al. | |
| 9,330,632 B2 | 5/2016 | Shepelev et al. | |
| 2014/0009412 A1* | 1/2014 | Ahn | G06F 3/0304 345/173 |
| 2015/0062453 A1* | 3/2015 | Kim | G02F 1/136286 349/12 |
| 2017/0185213 A1* | 6/2017 | Wang | G06F 1/32 |

* cited by examiner

*Primary Examiner* — Gerald Johnson
(74) *Attorney, Agent, or Firm* — Harness, Dickey & Pierce, P.L.C.

(57) ABSTRACT

A touch display driving integrated circuit (TDDIC) is configured to control a touch display panel. The TDDIC includes a touch driving circuit that performs a touch scan operation on the touch display panel, and a display driving circuit that performs a display operation on the touch display panel. The touch driving circuit operates in a first operation mode having a first touch scan frequency, and operates in a second operation mode having a second touch scan frequency different from the first touch scan frequency when a touch is detected from the touch display panel in the first operation mode.

20 Claims, 12 Drawing Sheets

TOUCH DISPLAY DRIVING INTEGRATED CIRCUIT AND OPERATION METHOD THEREOF

CROSS-REFERENCE TO RELATED APPLICATIONS

This U.S. non-provisional patent application claims priority under 35 U.S.C. § 119 of Korean Patent Application No. 10-2017-0037807, filed on Mar. 24, 2017, the entire contents of which are hereby incorporated by reference.

BACKGROUND

At least some example embodiments of inventive concepts described herein relate to a display device, such as a touch display driving integrated circuit (IC) and an operation method thereof.

A display device includes a plurality of gate lines, a plurality of data lines, and a plurality of pixels. The pixels are connected with the gate lines and the data lines. The display device includes a gate driving circuit controlling the gate lines and a data driving circuit controlling the data lines. The gate driving circuit provides a gate signal to each gate line, and the data driving circuit provides a data signal to each data line.

As a user terminal is miniaturized, nowadays, an in-cell type touch display device in which a display device and a touch panel are integrated is being developed. In the touch display device, an area that is occupied by the touch panel and a panel of the display device may be reduced by integrating the touch panel and the panel (or called a "display panel") of the display device.

SUMMARY

However, various issues (e.g., an increase in power consumption and noise generation) occur due to driving methods as the touch panel and the display panel are integrated.

Example embodiments of inventive concepts provide a touch display driving integrated circuit that converts an operation mode based on whether a touch of a user is made and an operation method thereof.

According to an aspect of an example embodiment, a touch display driving integrated circuit (TDDIC) that is configured to control a touch display panel includes a touch driving circuit that performs a touch scan operation on the touch display panel, and a display driving circuit that performs a display operation on the touch display panel. The touch driving circuit operates in a first operation mode having a first touch scan frequency, and, operates in a second operation mode having a second touch scan frequency different from the first touch scan frequency when a first touch is detected from the touch display panel in the first operation mode.

According to another aspect of an example embodiment, a method of operating a touch display driving integrated circuit that is configured to control a touch display panel includes operating in a first operation mode, the operating in the first operation mode including, performing a touch scan operation in a vertical blank period of a vertical synchronization signal, and detecting a touch in the first operation mode, and operating in a second operation mode, the operating in the second operation mode including alternately performing a plurality of sub display operations and a plurality of sub touch scan operations during a period of the vertical synchronization signal, in response to the detected touch.

According to at least one example embodiment a touch display device includes a display panel having a plurality of pixels and a plurality of touch electrodes and a driving integrated circuit configured to operate in a first touch scan mode and change to a second touch scan mode upon detecting a touch in the first touch scan mode, the driving integrated circuit configured to perform a display operation during one display period and perform a touch operation during one touch period after performing the one display period in the first touch scan mode, the one display period and the one touch period being equal to or less than one frame length, and the driving integrated circuit configured to perform the display operation over a plurality of display sub-periods and perform the touch operation over a plurality of touch sub-periods, the display sub-periods and the touch sub-periods being intermingled.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Below, example embodiments of inventive concepts may be described in detail and clearly to such an extent that an ordinary one in the art easily implements inventive concepts.

Below, an operation in which a touch display driving integrated circuit (TDDIC) displays image information through pixels is referred to as "display operation", and an operation in which the TDDIC detects a touch of a user is referred to as "touch scan operation".

Below, a period in which the display operation is performed by the TDDIC is referred to as "display period", and a period in which the touch scan operation is performed by the TDDIC is referred to as "touch period".

However, for descriptive convenience, "that the TDDIC performs the display operation" and "that the TDDIC performs the display period" may be regarded as the same meaning, and "that the TDDIC performs the touch scan operation" and "that the TDDIC performs the touch period" may be regarded as the same meaning. That is, that the TDDIC performs the display period may mean that the TDDIC performs the display operation, and that the TDDIC performs the touch period may mean that the TDDIC performs the touch scan operation.

The above-described contents may be to describe example embodiments, and example embodiments of inventive concepts are not limited thereto.

Figure 1:
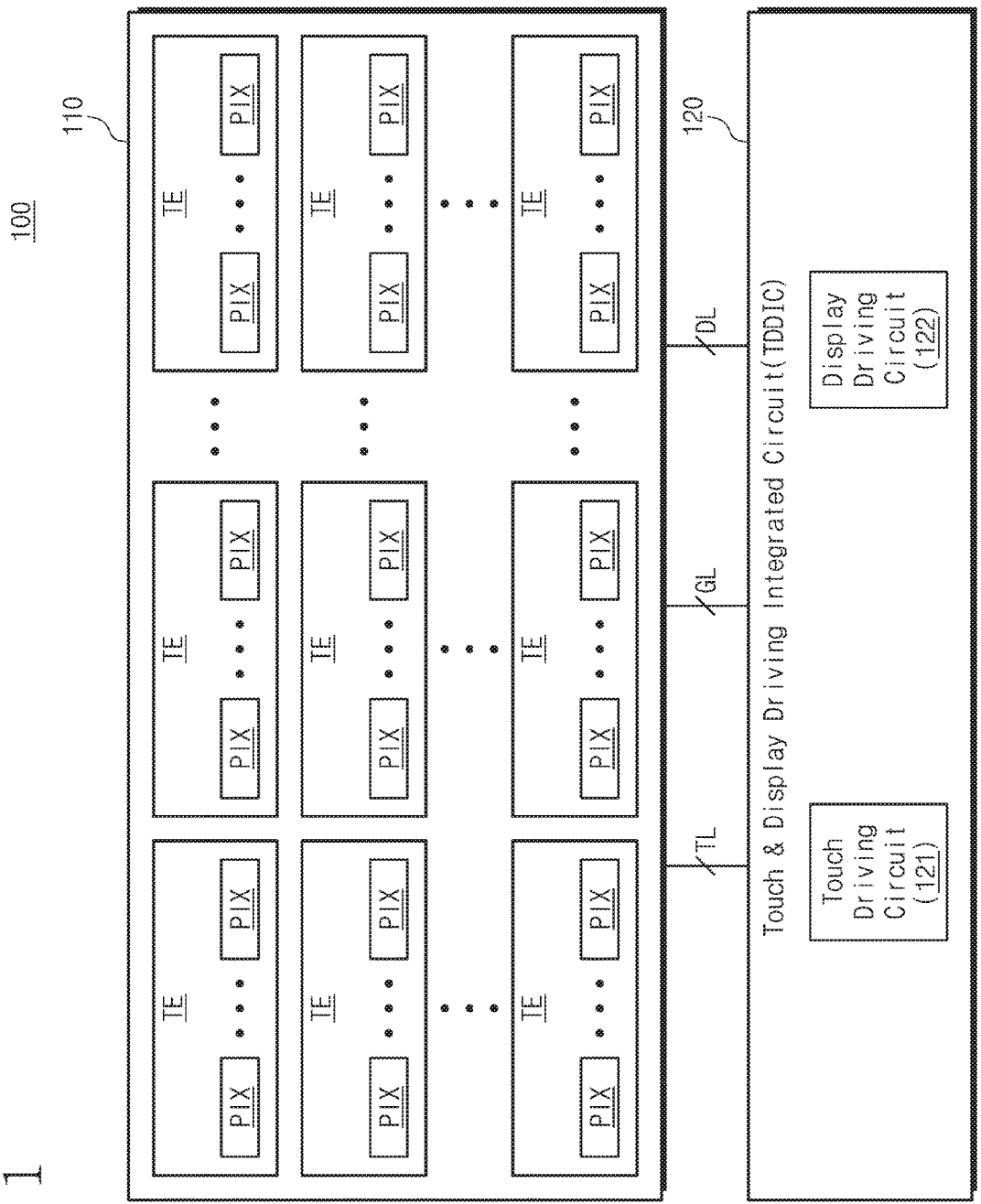
FIG. 1 is a block diagram illustrating a touch display device, according to an example embodiment of inventive concepts.

FIG. 1 is a block diagram illustrating a touch display device 100, according to an example embodiment of inventive concepts. Referring to FIG. 1, the touch display device 100 may include a touch display panel 110 and a touch display driving integrated circuit (TDDIC) 120. In example embodiments, the touch display device 100 may be a display device having a function for detecting a touch. For example, the touch display device 100 may operate to output specific image information or to sense or detect a touch.

The touch display panel 110 may include a plurality of pixels PIX and a plurality of touch electrodes TE. The pixels PIX may be connected with gate lines GL and data lines DL. Each of the pixels PIX may be configured to display image information based on voltages of the corresponding gate and data lines GL and DL.

In example embodiments, the pixels PIX may be classified into a plurality of groups based on colors to be displayed. Each pixel PIX may display one of primary colors. The primary colors may include, but not limited to, red, green, blue, and white. However, example embodiments of inventive concepts are not limited thereto. For example, the primary colors may further include various colors such as yellow, cyan, and magenta.

Each of the touch electrodes TE may be used as an electrode for sensing a touch. For example, the TDDIC 120 may detect a touch by providing a touch sensing signal to each touch electrode TE and detecting a change in the touch sensing signal.

Each of the touch electrodes TE may be used as a common electrode of the pixels PIX. For example, each of the touch electrodes TE may be used as the common electrode for providing a common voltage VCOM. Each of the pixels PIX may output image information based on a difference between a data signal received through the corresponding data line DL and the common voltage VCOM provided through the corresponding touch electrode TE. In example embodiments, the common voltage VCOM may be a negative voltage of about −1.3 V.

In example embodiments, the touch display panel 110 may be an in-cell type of a touch display panel. The in-cell type of a touch display panel may be a panel that includes a plurality of pixels PIX and a plurality of touch electrodes TE formed on the same panel or the same substrate. However, example embodiments of inventive concepts are not limited thereto. For example, the touch display panel 110 may be a touch display panel of an in-cell, on-cell, or out-cell type.

In example embodiments, an area of one touch electrode TE may be larger than that of one pixel PIX. That is, one touch electrode TE may be used as the common electrode for one or more pixels PIX. In other words, one touch electrode TE may correspond to one or more pixels PIX. In example embodiments, the touch electrode TE may be a transparent conductive layer such as indium tin oxide (ITO).

Although not illustrated in FIG. 1, the touch display panel 110 may be implemented with various display panels such as a liquid crystal display panel, an organic light emitting display panel, an electrophoretic display panel, and an electrowetting display panel. However, the touch display panel 110 is not limited thereto. For example, the touch display panel 110 may be implemented with the above-described display panels or other display panels. In example embodiments, the touch display device 100 including the liquid crystal display panel may further include a polarizer (not illustrated), a backlight unit (not illustrated), etc.

The TDDIC 120 may be connected with the touch display panel 110 through the gate lines GL, the data lines DL, and touch lines TL.

For example, the TDDIC 120 may be connected with the pixels PIX included in the touch display panel 110 through the gate lines GL. The TDDIC 120 may control a voltage of the gate line GL connected with each pixel PIX or may provide a gate signal or a gate voltage through each gate line GL.

In example embodiments, although not illustrated in FIG. 1, the touch display panel 110 may include level shifters configured to be connected with the plurality of pixels PIX through the plurality of gate lines GL. The level shifters may be configured to sequentially provide a gate signal to the plurality of gate lines GL in response to a gate voltage from the TDDIC 120.

The TDDIC 120 may be connected with the pixels PIX through the data lines DL. The TDDIC 120 may provide data signals (or image signals) to the pixels PIX through the data lines DL. Each pixel PIX may output image information in response to the received data signal.

The TDDIC 120 may be connected with the touch electrodes TE through the touch lines TL. The TDDIC 120 may provide a touch sensing signal to each touch line TL and may sense whether a touch of the user is made, based on a change in the touch sensing signal.

For example, in the case where a touch of the user is occurred on at least one touch electrode TE of the plurality of touch electrodes TE, capacitance of the at least one touch electrode TE may change. The change in capacitance may cause a change in the touch sensing signal. The TDDIC 120 may sense a change in capacitance of the at least one touch electrode TE based on a change in the touch sensing signal provided to the at least one touch electrode TE. As such, it may be detected that a touch is generated at a touch electrode TE at which the change in capacitance is sensed. In example embodiments, a touch of the user may indicate a contact of a part of a user's body or a contact of any other touch recognition device (e.g., a stylus pen, a touch-recognizable device). Below, for descriptive convenience, the user touch may be simply referred to as a "touch".

Information (i.e., a location on a panel, address information, and a touch pressure) of a touch electrode TE at which the touch is detected may be provided to an external device (e.g., CPU or AP). The external device may perform the corresponding operation (e.g., screen change, screen zoom-in/zoom-out or reduction/magnification, execution of a specific app, or execution of a specific function) based on the received information.

In example embodiments, the above-described touch detecting method of the TDDIC 120 may be called a "self-capacitance method". However, example embodiments of inventive concepts are not limited thereto. For example, the touch detecting method may be implemented in a mutual-capacitance scheme. In this case, a structure of the touch display panel 110 may be appropriately changed or modified.

In example embodiments, the TDDIC 120 may operate in synchronization with control signals received from a separate control circuit (e.g., a timing controller) (not illustrated). For example, the control signals may include a vertical synchronization signal and a horizontal synchronization signal. The vertical synchronization signal may be a signal for distinguishing frames to be displayed through the pixels PIX. The horizontal synchronization signal may be a signal for identifying a row corresponding to data signals provided through the data lines DL, that is, a row identification signal. In response to the control signals, the TDDIC 120 may control a voltage of the gate line GL connected with the corresponding pixel PIX, may provide a data signal through the data line DL connected with the corresponding pixels PIX, and may control the corresponding touch line TL.

In example embodiments, the TDDIC 120 may perform at least one display period and at least one touch period while one frame is displayed (i.e., during one cycle of the vertical synchronization signal), based on an operation mode or a touch scan manner. For example, on the basis of the operation mode or the touch scan manner, the TDDIC 120 may display all or a part of one frame during at least one display period and may perform a touch scan operation on all or some of the touch electrodes TE during at least one touch period. In example embodiments, one frame may indicate a unit of image information to be displayed by the pixels PIX included in the touch display panel 110.

In example embodiments, the touch scan manner may indicate a driving manner of the touch scan operation for the TDDIC 120 to detect the touch. Various touch scan manners will be more fully described with reference to FIGS. 6 to 9.

In example embodiments, the TDDIC 120 may change an operation mode based on the touch detection result. For example, the TDDIC 120 may be configured to operate in a detection mode when the touch is not detected. In contrast, the TDDIC 120 may be configured to operate in an activation mode when the touch is detected.

In example embodiments, the detection mode may indicate an operation mode for detecting simply the touch. Information of a touch detected in the detection mode may be used to change the operation mode and may not be provided to an external device (e.g., CPU or AP). In contrast, the activation mode may indicate an operation mode in which an operation corresponding to a detected touch is performed by detecting the touch and providing the detected information to the external device (e.g., CPU or AP).

That is, the detection mode may indicate an operation mode for sensing a touch to change simply a mode, and the activation mode may indicate an operation mode for sensing a touch and performing an operation corresponding to the sensed touch. However, example embodiments of inventive concepts are not limited thereto. For example, a touch detected in the detection mode may be provided to an external device.

Below, for descriptive convenience, the terms "detection mode" and "activation mode" may be used as the operation mode of the TDDIC 120. The terms "detection mode" and "activation mode" used in this specification may be terms that are distinguished according to a touch scan manner of the TDDIC 120. Also, "the detection mode of the TDDIC 120" used in this specification may mean "a touch scan manner performed when the TDDIC 120 operates in the detection mode". Also, "the activation mode of the TDDIC 120" may mean "a touch scan manner performed when the TDDIC 120 operates in the activation mode". That is, in this specification, the operation mode of the TDDIC 120 may mean the corresponding touch scan manner.

However, the above-described contents may be to describe example embodiments easily and clearly, and example embodiments of inventive concepts are not limited thereto.

In example embodiments, touch scan manners of the detection mode and the activation mode may be different from each other. For example, a touch scan frequency of the detection mode may be lower than that of the activation mode. The touch scan frequency may indicate the number of times of a touch scan operation performed per second with respect to the plurality of touch electrodes TE.

For another example, touch sensing performance of the detection mode may be lower than that of the activation mode. For another example, power consumption of the detection mode may be lower than that of the activation mode. Alternatively, the amount of noise generated in the detection mode may be smaller than that generated in the activation mode. That is, the detection mode may have low touch sensing performance compared with the activation mode. However, in the case of the detection mode, power consumption may be low, and noise generation may be small.

That is, in the case where a touch is not detected, the TDDIC 120 may operate in the detection mode, thereby reducing power consumption and noise generation. In contrast, in the case where a touch is detected, the TDDIC 120 may operate in the activation mode, thereby improving the touch sensing performance.

In example embodiments, the detection mode and the activation mode may be variously changed according to a touch scan manner to be performed. Alternatively, the TDDIC 120 may variously change a touch scan manner to be performed in the activation mode, based on a touch detection result. Various touch scan manners in the detection mode and the activation mode will be more fully described with reference to FIGS. 6 to 9.

In example embodiments, the TDDIC 120 may include a touch driving circuit 121 and a display driving circuit 122. The touch driving circuit 121 is configured to perform the above-described touch scan operation, and the display driving circuit 122 is configured to perform the above-described display operation.

In example embodiments, the touch driving circuit 121 and the display driving circuit 122 may be configured to perform a touch scan operation and a display operation corresponding to an operation mode (i.e., the detection mode or the activation mode) of the TDDIC 120.

The touch driving circuit 121 and the display driving circuit 122 may be implemented with separate function blocks as illustrated in FIG. 1 or may be implemented with one function block.

Below, example embodiments of inventive concepts will be described with respect to an operation of the TDDIC 120 to make a description of example embodiments unambiguous, and the functions performed by the touch driving circuit 121 and the display driving circuit 122 are described together.

However, inventive concepts are not limited thereto. For example, various functions or operations associated with the touch scan operation may be performed by the touch driving circuit 121, and various functions or operations associated with the display operation may be performed by the display driving circuit 122.

Figure 2:
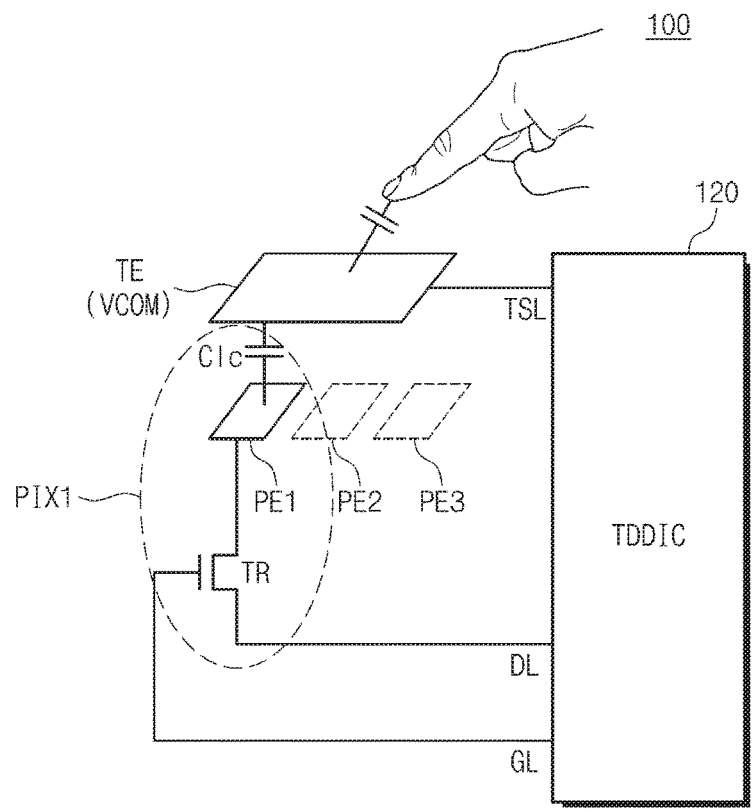
FIG. 2 is a diagram for describing a configuration of a touch electrode and pixels of the touch display device of FIG. 1.

FIG. 2 is a diagram for describing a configuration of a touch electrode TE and a pixel of the touch display device 100 of FIG. 1. For ease of illustration and for descriptive convenience, the connection and configuration of a pixel PIX1, a touch electrode TE, and the TDDIC 120 will be described with reference to some components. However, example embodiments are not limited thereto. For example, the touch display panel 110 may further include other components such as a color filter and a level shifter.

Referring to FIGS. 1 and 2, a first pixel PIX1 may include a first pixel electrode PE1 and a transistor TR. In example embodiments, the transistor TR may be a thin film transistor (TFT). A source of the transistor TR may be connected with the TDDIC 120 through the data line DL, a drain thereof may be connected with the first pixel electrode PE1, and a gate thereof may be connected with the TDDIC 120 through the gate line GL.

In example embodiments, a liquid crystal layer (not illustrated) may be disposed between the first pixel electrode PE1 and the touch electrode TE. A liquid crystal capacitor Clc may exist between the first pixel electrode PE1 and the touch electrode TE. The common voltage VCOM is applied to the touch electrode TE. Under control of the TDDIC 120, an electric field may be formed by a voltage received through the data line DL and the common voltage VCOM of the touch electrode TE. Arrangement of a liquid crystal director of the liquid crystal layer (not illustrated) may be changed according to the formed electric field. On the basis of the arrangement of the liquid crystal directors, light incident on the liquid crystal layer may pass through the liquid crystal layer or may be blocked. In a display period of the touch display device 100, image information may be displayed based on the above-described operation of the first pixel PIX1.

In a touch period of the touch display device 100, the TDDIC 120 may drive the touch line TL connected with the touch electrode TE. For example, in the touch period, the TDDIC 120 may provide a touch sensing signal through the touch line TL. In the case where a part (e.g., a finger) of a user's body (or a touch recognition device) touches the touch electrode TE or approaches the touch electrode TE, a touch sensing signal provided to the touch line TL may change by capacitance between the touch electrode TE and the portion of the user's body. The TDDIC 120 may sense a signal change of the touch line TL and may recognize the touch based on the sensing result.

In example embodiments, as illustrated in FIG. 2, one touch electrode TE may be disposed on or over a plurality of pixel electrodes PE1 to PE3. For example, as described with reference to FIG. 1, the touch electrode TE may be used as a common electrode in the display period. That is, in the display period, image information may be displayed by a voltage difference between the touch electrode TE used as the common electrode and the pixel electrodes PE1, PE2, and PE3.

In example embodiments, the arrangement and configuration of the pixel electrodes PE1, PE2, and PE3 and the touch electrode TE illustrated in FIG. 2 are an example, and inventive concepts are not limited thereto. The arrangement and configuration of pixel electrodes and touch electrodes may be variously changed or modified.

Figure 3:
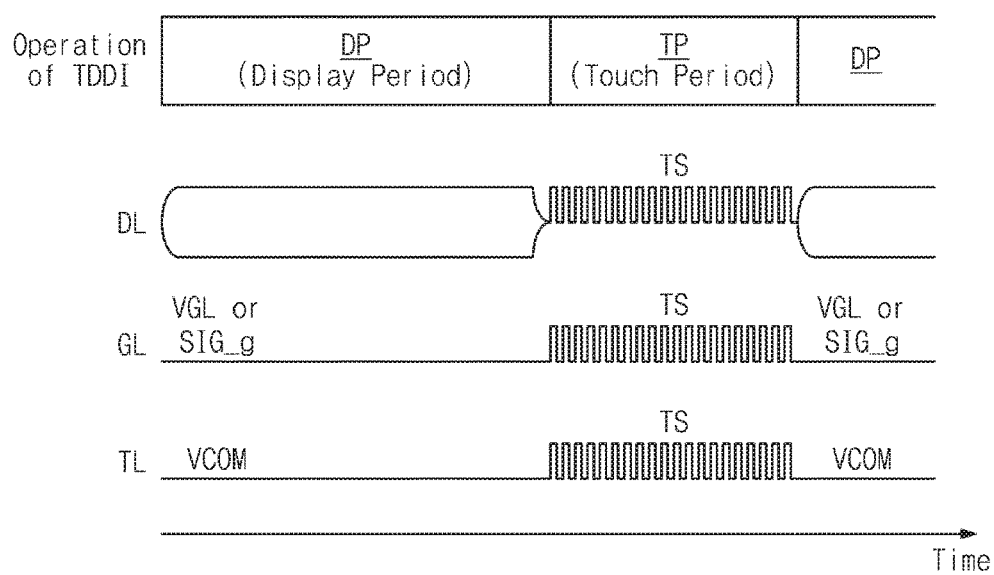
FIG. 3 is a timing diagram for describing a display period and a touch period of the touch display device of FIG. 1.

FIG. 3 is a timing diagram for describing a display period and a touch period of the touch display device 100 of FIG. 1. For brevity of illustration and for descriptive convenience, components that are unnecessary to describe the display period and the touch period are omitted. Also, signals or voltages provided through the data line DL, the gate line GL, and the touch line TL may be schematically illustrated, but example embodiments of inventive concepts are not limited thereto. Actual waveforms of signals provided through the data line DL, the gate line GL, and the touch line TL may be different from waveforms illustrated in FIG. 3.

Referring to FIGS. 1 and 3, the TDDIC 120 may alternately (or, by turns) perform a display period DP and a touch period TP. First, in the display period DP, the TDDIC 120 may control the data line DL, the gate line GL, and the touch line TL such that all or some of a plurality of pixels PIX included in the touch display panel 110 display image information.

For example, in the display period DP, the TDDIC 120 may provide a data signal to pixels PX through the data line DL, may provide a gate voltage VGL or a gate signal SIG_g to the gate line GL, and may provide the common voltage VCOM to the touch line TL. In example embodiments, the gate voltage VGL may be a voltage for providing a gate signal to the pixels PIX. In example embodiments, the gate voltage VGL may be a turn-off voltage of the transistor TR (refer to FIG. 2) included in the pixel PIX. In example embodiments, the gate signal SIG_g based on the gate voltage VGL may be provided to the gate lines GL.

In example embodiments, the gate signal SIG_g may be a signal that is synchronized with a control signal (e.g., a horizontal synchronization signal). In example embodiments, the gate signal SIG_g may be a signal that is toggled between the gate voltage VGL and a gate voltage VGH. In example embodiments, the gate voltage VGH may be a turn-on voltage of the transistor TR included in the pixel PIX.

In the display period DP, the touch display device 100 may display image information in response to signals from the TDDIC 120. In example embodiments, in the display period DP, the pixels PIX may be configured to display image information in units of a row.

In example embodiments, in one display period DP, the number or groups of pixels displaying image information may change depending on a touch scan manner. For example, in the case where the TDDIC 120 operates in a specific touch mode, in one display period DP, all of the plurality of pixels may display image information. Alternatively, in the case where the TDDIC 120 operates in another touch mode, in one display period DP, some of the plurality of pixels PIX may display image information, and the remaining pixels may display image information in a next display period DP.

After the display period DP ends, the TDDIC 120 may perform the touch period TP. The touch period TP indicates a period in which a touch scan operation or a touch sensing operation for sensing a touch is performed.

For example, after the display period DP ends, in the touch period TP, the TDDIC 120 may provide a touch sensing signal TS to the touch line TL. The TDDIC 120 may sense a change of the touch sensing signal TS during the touch period TP and may determine whether a touch is made, based on the sensing result.

In example embodiments, to perform a stable touch sensing operation in the touch period TP, the TDDIC 120 may be configured to provide the touch sensing signal TS to each of the data line DL and the gate line GL. That is, the TDDIC 120 may provide the touch sensing signal TS to each of the touch line TL, the data line DL, and the gate line GL in the touch period TP, thereby offsetting influence of parasitic capacitance in the touch display panel 110.

After the touch period TP ends, the TDDIC 120 may perform the display period DP. In example embodiments, duration, the number of times, etc. of the display period DP and the touch period TP may be adjusted according to a touch scan manner.

Figure 4:
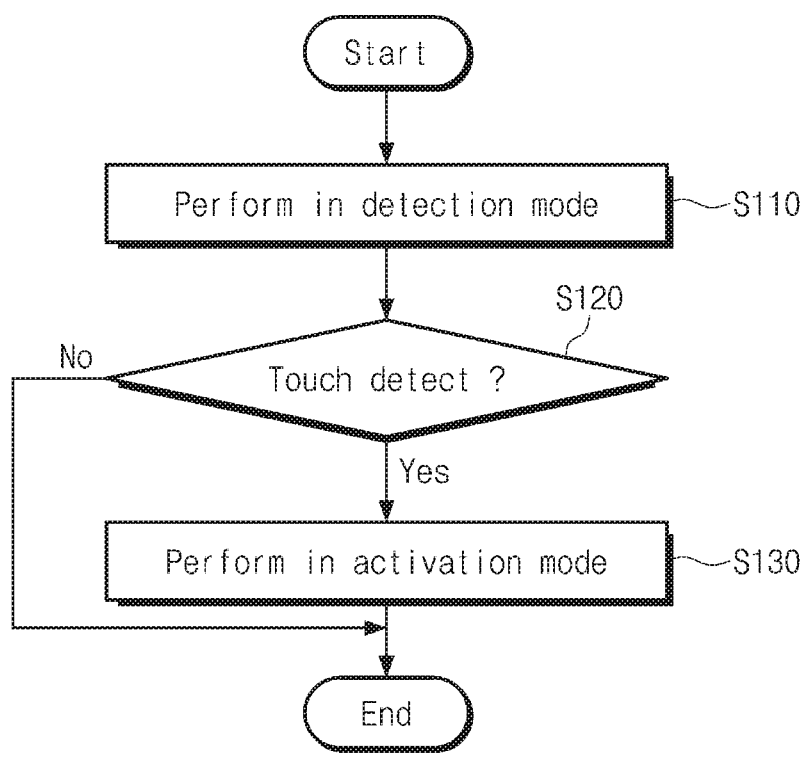
FIG. 4 is a flowchart illustrating an operation of a touch display driving integrated circuit (TDDIC) of FIG. 1.

FIG. 4 is a flowchart illustrating an operation of the TDDIC 120 of FIG. 1. Referring to FIGS. 1 and 4, in operation S110, the TDDIC 120 may operate in a detection mode. For example, the TDDIC 120 may operate in the detection mode to detect a touch. As described with reference to FIG. 1, information of the touch detected in the detection mode may be used to change simply an operation mode and may not be provided to an external device (e.g., CPU or AP). However, example embodiments of inventive concepts are not limited thereto. For example, information of a touch detected in the detection mode may be provided to an external device.

Alternatively, the detection mode may operate in a touch scan manner having relatively low power consumption compared with the activation mode to be described below. Alternatively, the detection mode may operate in a touch scan manner having relatively low touch sensing performance compared with the activation mode to be described below. Alternatively, the detection mode may operate in a touch scan manner having relatively low noise generation compared with the activation mode to be described below.

In operation S120, the TDDIC 120 may determine whether a touch is detected. For example, as described above, the TDDIC 120 may operate to detect a touch in a touch period TP.

If the touch is detected, the TDDIC 120 may operate in the activation mode at S130. As described with reference to FIG. 1, the activation mode may indicate an operation mode in which the corresponding operation is performed by detecting a touch and providing information of the detected touch to an external device. In example embodiments, differences between the detection mode and the activation mode are described with reference to operation S110, and a detailed description thereof is thus omitted.

As described above, in the case where a touch is not detected, the TDDIC 120 may operate in the detection mode, thereby reducing power consumption and noise generation. Also, in the case where a touch is detected, the TDDIC 120 may operate in the activation mode, thereby improving the touch sensing performance. With the above description, a touch display device of reduced power consumption and improved performance is provided.

Figure 5:
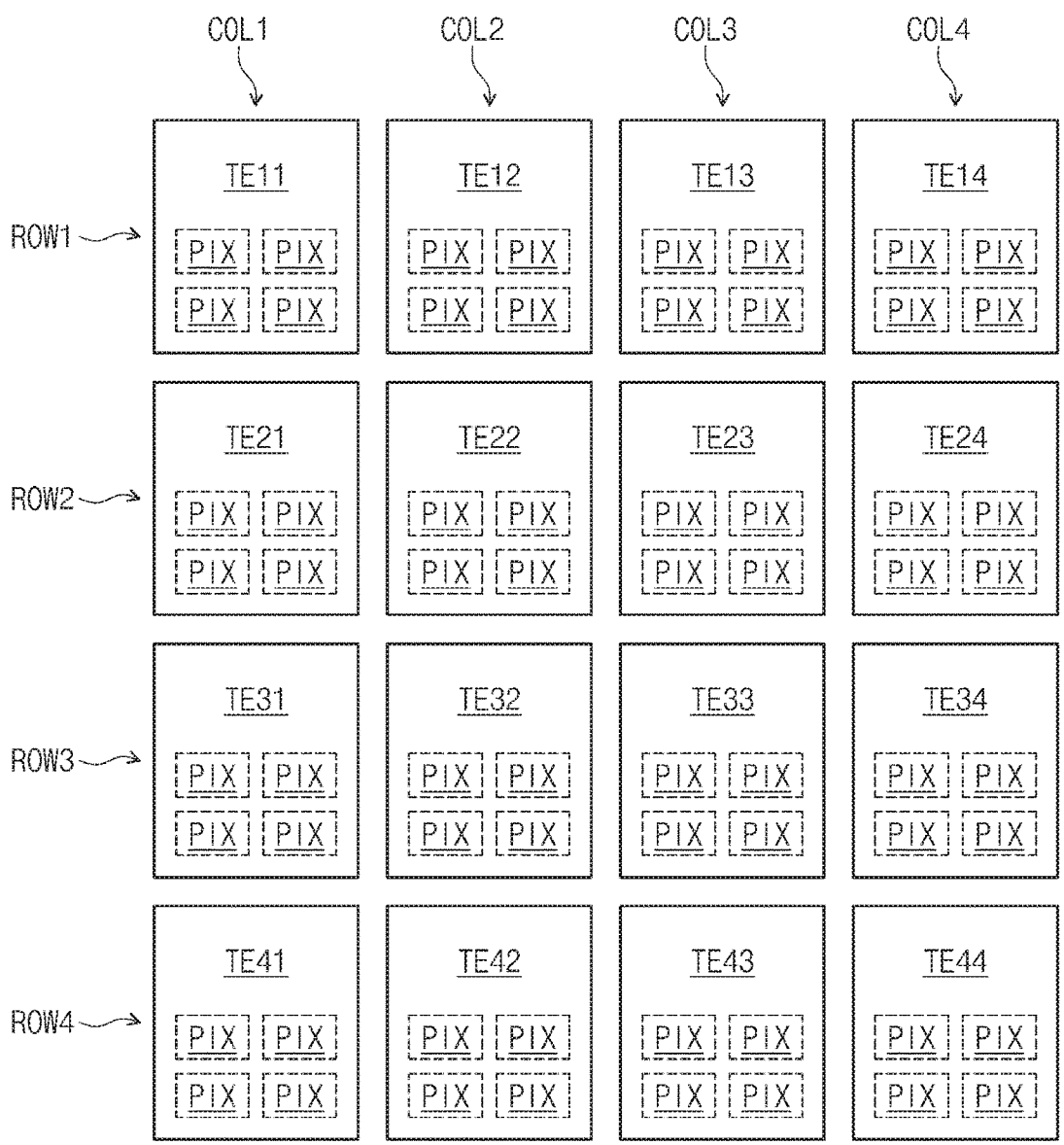
FIG. 5 is a diagram illustrating a touch display panel of FIG. 1.

FIG. 5 is a diagram illustrating the touch display panel 110 of FIG. 1. The arrangement and configuration of the touch display panel 110 illustrated in FIG. 5 are an example for describing a touch scan manner to be described below, not limiting example embodiments of inventive concepts. The touch display panel 110 may further include other touch electrodes or other pixels, and the arrangement and structure of touch electrodes and pixels may be variously changed or modified.

Referring to FIG. 5, the touch display panel 110 may include a plurality of touch electrodes TE11~TE44. The plurality of touch electrodes TE11~TE44 may be arranged along first to fourth rows ROW1-ROW4 and first to fourth columns COL1~COL4.

Each of the plurality of touch electrodes TE11~TE44 may correspond to four pixels PIX. For example, the touch electrode TE11 at the first row ROW1 and the first column COL1 may correspond to four pixels PIX, and the touch electrode TE11 may be used as a common electrode of the corresponding four pixels PIX. The remaining touch electrodes TE12 to TE44 may also have a structure similar to the touch electrode TE11.

Figure 6:
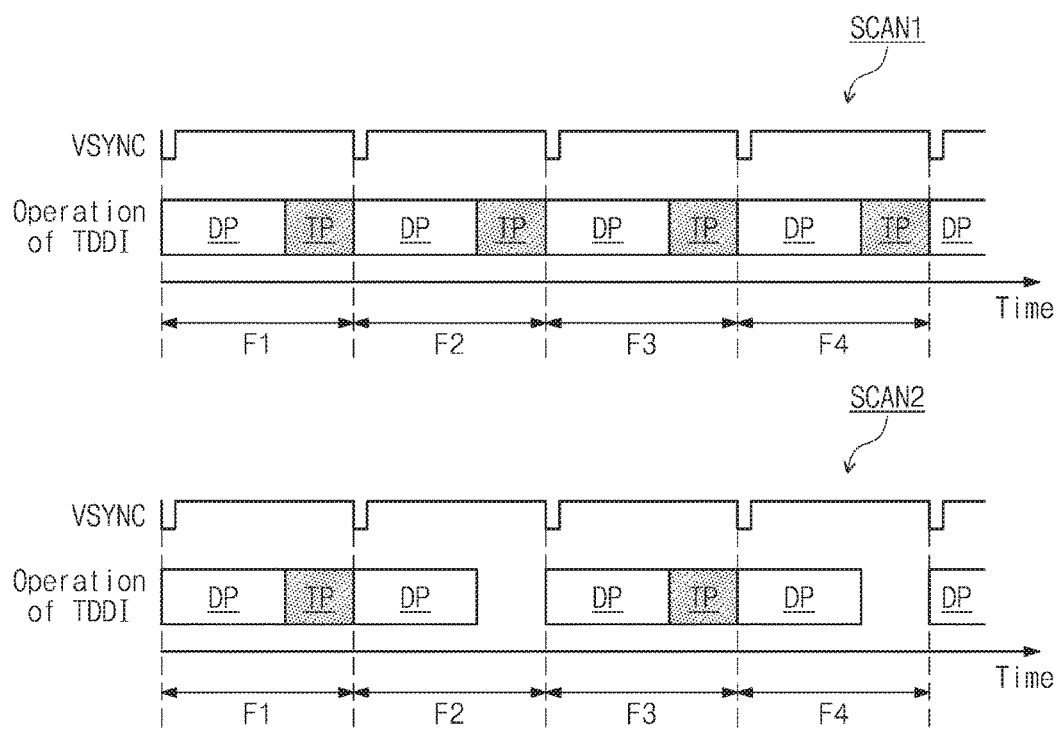
FIGS. 6 to 8 are timing diagrams for describing a touch scan manner.
Figure 7:
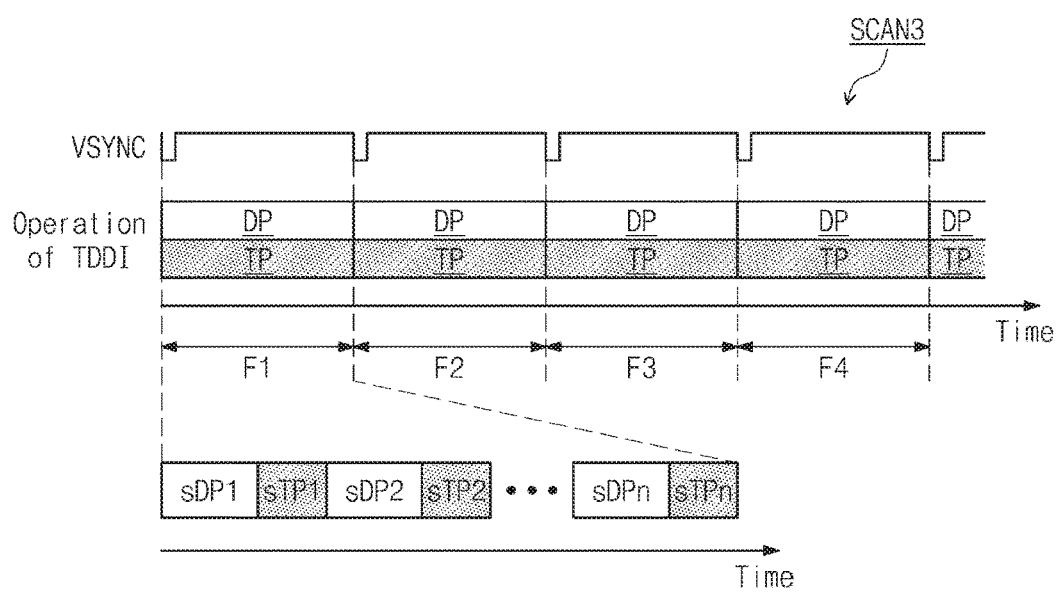
Figure 8:
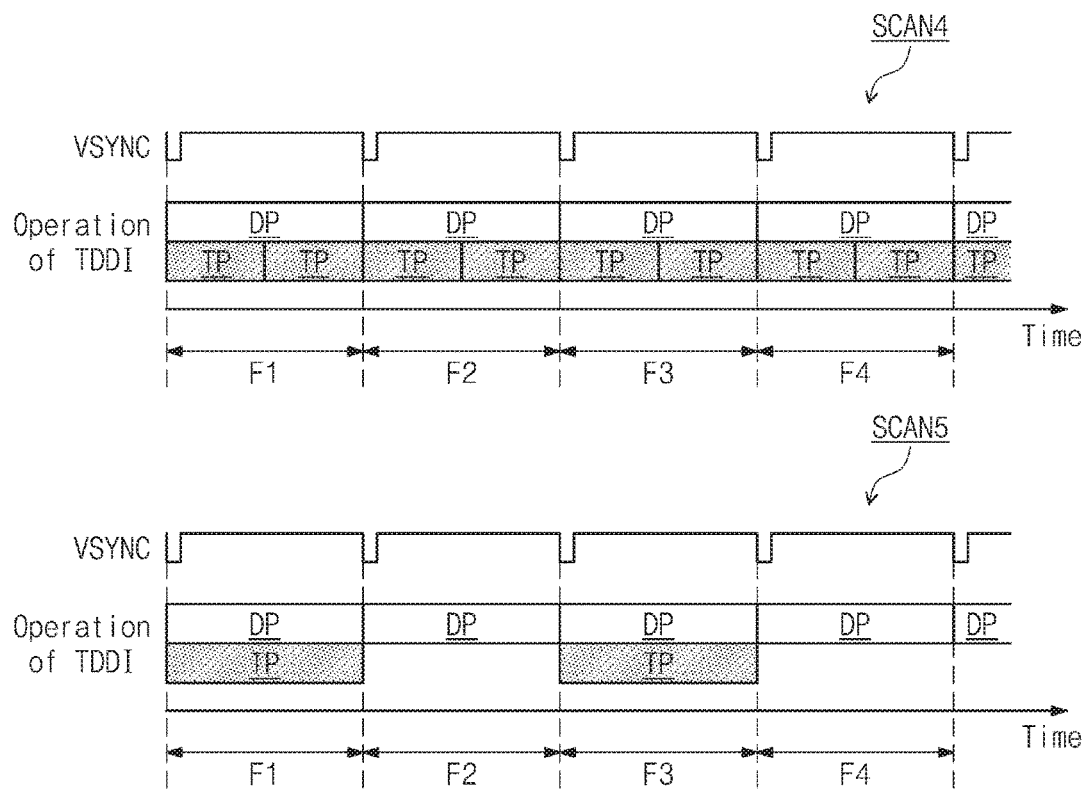

FIGS. 6 to 8 are timing diagrams for describing a touch scan manner. In FIGS. 6 to 8, a horizontal axis represents a time. For descriptive convenience, touch scan manners illustrated in FIGS. 6 to 8 will be described based on the configuration of the touch display panel 110 illustrated in FIG. 5.

In example embodiments, in the detection mode, the TDDIC 120 may operate in at least one of touch scan manners to be described with reference to FIGS. 6 to 8. Alternatively, in the activation mode, the TDDIC 120 may operate in at least one of touch scan manners to be described with reference to FIGS. 6 to 8. However, example embodiments of inventive concepts are not limited thereto, and other touch scan manners as well as the touch scan manners of FIGS. 6 to 8 may be further included.

In the following drawings, it is assumed that one display period DP indicates a period for displaying one frame of an image. That is, it is assumed that the TDDIC 120 displays one frame of an image through a plurality of pixels PIX by performing one display period DP. In this case, an image displaying method may be performed, but not limited to, in units of a row, a column or a pixel group.

Also, it is assumed that one touch period TP indicates a period in which a touch scan operation is once performed on the plurality of touch electrodes TE11~TE44. That is, the TDDIC 120 may perform the touch scan operation on each of the plurality of touch electrodes TE11~TE44 once by performing one touch period TP. The touch scan operation may be performed, but not limited to, in units of a row, a column or a touch electrode group.

Also, for brevity of illustration, a porch period or a blank period of the display period DP is omitted in some drawings (e.g., FIG. 7 and FIG. 8).

Referring to FIGS. 1, 5, and 6, the TDDIC 120 may operate in a first touch scan manner SCAN1. According to the first touch scan manner SCAN1, the TDDIC 120 may perform one display period DP and one touch period TP during one cycle of a vertical synchronization signal VSYNC. For example, during a first cycle F1 of the vertical synchronization signal VSYNC, the TDDIC 120 may display an image of one frame through a plurality of pixels PIX by performing the display period DP. Afterwards, the TDDIC 120 may perform the touch scan operation on the plurality of touch electrodes TE11~TE44 by performing the touch period TP.

Likewise, in each of second to fourth periods F2 to F4 of the vertical synchronization signal VSYNC, the TDDIC 120 may display one frame of an image and a touch scan operation on the plurality of touch electrodes TE11~TE44 by alternately performing the display period DP and the touch period TP. In example embodiments, since the touch scan operation is performed every one period of the vertical synchronization signal VSYNC, in the case where a frequency of the vertical synchronization signal VSYNC is 60 Hz, a touch scan frequency of the first touch scan manner SCAN1 may be 60 Hz.

Next, the TDDIC 120 may operate in a second touch scan manner SCAN2. According to the second touch scan manner SCAN2, the TDDIC 120 may perform one display period DP during the one cycle of the vertical synchronization signal VSYNC and may perform one touch period TP during the two cycle of the vertical synchronization signal VSYNC.

For example, during a first cycle F1 of the vertical synchronization signal VSYNC, the TDDIC 120 may display one frame of an image through a plurality of pixels PIX by performing the display period DP. Afterwards, the TDDIC 120 may perform the touch scan operation on the plurality of touch electrodes TE11~TE44 by performing the touch period TP. During a second cycle F2 of the vertical synchronization signal VSYNC, the TDDIC 120 may perform only the display period DP and may not perform the touch period TP. During a third cycle F3 of the vertical synchronization signal VSYNC, the TDDIC 120 may perform the display period DP and touch period TP; during a fourth cycle F4 of the vertical synchronization signal VSYNC, the TDDIC 120 may perform only the display period DP and may not perform the touch period TP.

As such, according to the second touch scan manner SCAN2, the TDDIC 120 may perform the display period DP in every cycle of the vertical synchronization signal VSYNC and may perform the touch period TP every two cycles of the vertical synchronization signal VSYNC. In example embodiments, according to the second touch scan manner SCAN2, since the touch scan operation is performed every two cycles of the vertical synchronization signal VSYNC, in the case where a frequency of the vertical synchronization signal VSYNC is 60 Hz, a touch scan frequency of the first touch scan manner SCAN2 may be 30 Hz.

In the first and second touch scan manners SCAN1 and SCAN2, the touch period TP may be performed in the porch period or blank period of the display period DP. This touch scan manner may be called a "vertical blank (VB) type".

The first and second touch scan manners SCAN1 and SCAN2 have different touch scan frequencies. As illustrated in FIG. 6, the first touch scan manner SCAN1 has a touch scan frequency higher than the second touch scan manner SCAN2. That is, the touch sensing performance of the first touch scan manner SCAN1 is better than the second touch scan manner SCAN2, but, the first touch scan manner SCAN1 may consume a lot of power and may generate a lot of noise compared with the second touch scan manner SCAN2.

Referring to FIGS. 1, 5, and 7, the TDDIC 120 may operate in a third touch scan manner SCAN3. According to the third touch scan manner SCAN3, the TDDIC 120 may perform one display period DP and one touch period TP during one cycle of the vertical synchronization signal VSYNC.

In example embodiments, for ease of illustration, the display period DP and touch period TP are illustrated as being performed in parallel. However, example embodiments of inventive concepts are not limited thereto. For example, unlike the first touch scan manner SCNA1 of FIG. 6, in the third touch scan manner SCAN3, the touch period TP may be performed in a state where the touch period TP is divided into a plurality of sub touch periods sTP1 to sTPn.

As a more detailed example, during a first cycle F1 of the vertical synchronization signal VSYNC, the TDDIC 120 may perform the display period DP and the touch period TP while the display period DP is divided into a plurality of sub display periods sDP1 to sDPn and the touch period TP is divided into a plurality of sub touch periods sTP1 to sTPn.

In this case, in each of the plurality of sub display period sDP1 to sDPn, an image may be displayed by some of pixels PIX; in each of the plurality of sub touch periods sTP1 to sTPn, a touch scan operation may be performed on some of the touch electrodes TE11~TE44. The TDDIC 120 may alternately perform the plurality of sub display periods sDP1 to sDPn and the plurality of sub touch periods sTP1 to sTPn as illustrated in FIG. 7. Thus, the plurality of sub display periods sDP1 to sDPn and the plurality of sub touch periods sTP1 to sTPn may be intermingled.

To describe a more detailed example with reference to the touch display panel 110 of FIG. 5, it is assumed that "n" is 4 in the plurality of sub display periods sDP1 to sDPn and the plurality of sub touch periods sTP1 to sTPn. In a first sub display period sDP1, the TDDIC 120 may perform a display operation on pixels PIX included in the first row ROW1. That is, in the first sub display period sDP1, the TDDIC 120 may control the data line DL, the gate line GL, and the touch line TL such that pixels PIX included in the first row ROW1 display an image or a part of one frame.

Afterwards, in a first sub touch period sTP1, the TDDIC 120 may perform a touch scan operation on the touch electrodes TE11 to TE14 included in the first row ROW1. That is, in the first sub touch period sTP1, to sense a touch on the touch electrodes TE11 to TE14 included in the first row ROW1, the TDDIC 120 may provide the touch sensing signal TS to each of the touch line TL, the data line DL, and the gate line GL.

Afterwards, in a second sub display period sDP2, the TDDIC 120 may perform a display operation on pixels PIX included in the second row ROW2. In a second sub touch period sTP2, the TDDIC 120 may perform a touch scan operation on the touch electrodes TE21 to TE24 included in the second row ROW2.

Afterwards, in a third sub display period sDP3, the TDDIC 120 may perform a display operation on pixels PIX included in the third row ROW3. In a third sub touch period sTP3, the TDDIC 120 may perform a touch scan operation on the touch electrodes TE31 to TE34 included in the third row ROW3.

Afterwards, in a fourth sub display period sDP4, the TDDIC 120 may perform a display operation on pixels PIX included in the fourth row ROW4. In a fourth sub touch period sTP4, the TDDIC 120 may perform a touch scan operation on the touch electrodes TE41 to TE44 included in the fourth row ROW4.

In example embodiments, sub display periods and sub touch periods are described as being performed in units of a row. However, example embodiments of inventive concepts are not limited thereto. For example, operations of each sub display period and each sub touch period may be respectively performed in units of a row, a column, a pixel group, or a touch electrode group. Also, an operation order is not limited to a specific order. For example, a display operation may be performed on pixels PIX of the first row ROW1 in the first sub display period sDP1, and a touch scan operation may be performed on the touch electrodes TE12 to TE42 of the second column COL2 in the first sub touch period sTP1.

That is, during the first cycle F1 of the vertical synchronization signal VSYNC, the TDDIC 120 may display one frame of an image and perform a touch scan operation on each of the plurality of touch electrodes TE11~TE44, by alternately performing the first to fourth sub display periods sDP1 and sDP4 and the first to fourth sub touch periods sTP1 to sTP4.

Likewise, according to the third touch scan manner SCAN3, in each of second to fourth cycles F2 to F4 of the vertical synchronization signal VSYNC, the TDDIC 120 may alternately perform a plurality of sub display periods and a plurality of sub touch periods as described above.

In example embodiments, according to the third touch scan manner SCAN3, since the touch period TP is performed every cycle of the vertical synchronization signal VSYNC, in the case where a frequency of the vertical synchronization signal VSYNC is 60 Hz, a touch scan frequency of the third touch scan manner SCAN3 may be 60 Hz.

Referring to FIGS. 1, 5, and 8, the TDDIC 120 may operate in a fourth touch scan manner SCAN4. According to the fourth touch scan manner SCAN4, the TDDIC 120 may perform one display period DP and two touch periods TP during one cycle of the vertical synchronization signal VSYNC. In this case, as in that described with reference to FIG. 7, the display period DP and the touch period TP may be divided into a plurality of sub display periods and a plurality of sub touch periods.

That is, according to the fourth touch scan manner SCAN4, the TDDIC 120 may display one frame of an image and perform a touch scan operation on each of the touch electrodes TE11~TE44 two times, by alternately performing a plurality of sub display periods and a plurality of sub touch periods during one cycle of the vertical synchronization signal VSYNC. As a more detailed example, according to the fourth touch scan manner SCAN4, the TDDIC 120 may display half frame of the image and perform a touch scan operation on each of the touch electrodes TE11~TE44 once, by alternately performing a plurality of sub display periods and a plurality of sub touch periods during half the cycle of the vertical synchronization signal VSYNC. During the remaining cycle of the vertical synchronization signal VSYNC, the TDDIC 120 may display the remaining frame of image and perform a touch scan operation on each of the touch electrodes TE11~TE44 once, by alternately performing a plurality of sub display periods and a plurality of sub touch periods.

That is, according to the fourth touch scan manner SCAN4, in each of the first to fourth cycles F1 to F4 of the vertical synchronization signal VSYNC, a touch scan operation may be performed on each of the plurality of touch electrodes TE11~TE44 two times while one frame of an image is displayed.

In example embodiments, according to the fourth touch scan manner SCAN4, since two touch periods TP are performed every cycle of the vertical synchronization signal VSYNC, in the case where a frequency of the vertical synchronization signal VSYNC is 60 Hz, a touch scan frequency of the fourth touch scan manner SCAN4 may be 120 Hz.

Next, the TDDIC 120 may operate in a fifth touch scan manner SCAN5. According to the fifth touch scan manner SCAN5, the TDDIC 120 may perform a display period DP and a touch period TP during a first cycle F1 of the vertical synchronization signal VSYNC. In this case, the display period DP and the touch period TP are similar to those of the third touch scan manner SCAN3 of FIG. 7, and a detailed description thereof is thus omitted. According to the fifth touch scan manner SCAN5, the TDDIC 120 may perform only a display period DP during a second cycle F2 of the vertical synchronization signal VSYNC.

That is, the fifth touch scan manner SCAN5 may be similar to the fourth touch scan manner SCAN4 described with reference to FIG. 7 except that one touch period TP is performed every two cycles of the vertical synchronization signal VSYNC. In other words, according to the fifth touch scan manner SCAN5, the TDDIC 120 may perform a display period DP and a touch periods TP during a first cycle F1 of the vertical synchronization signal VSYNC, may perform the display period DP during a second cycle F2, may perform the display period DP and the touch period TP during a third cycle F3, and may perform the display period DP during a fourth cycle F4. In this case, the operations in the first and third cycles F1 and F3 may be similar to those of the third touch scan manner SCAN3 of FIG. 7.

In example embodiments, according to the fifth touch scan manner SCAN5, since one touch period TP is performed every two cycles of the vertical synchronization signal VSYNC, in the case where a frequency of the vertical synchronization signal VSYNC is 60 Hz, a touch scan frequency of the fifth touch scan manner SCAN5 may be 30 Hz.

In example embodiments, in the first touch scan manner SCAN1 or the second touch scan manner SCAN2 of FIG. 6, the touch period TP may be performed in the porch period or blank period of the display period DP. However, in the third to fifth touch scan manners SCAN3 to SCAN5 of FIGS. 7 and 8, the touch period TP may be divided into a plurality of sub touch periods sTP1 to sTPn, which are performed in the middle of the display period DP. The third to fifth touch scan manners SCAN3 to SCAN5 may be called a "long horizontal blank (LHB)" type.

That is, according to the third to fifth touch scan manners SCAN3 to SCAN5, since it is possible to sense a touch in the middle of displaying an image, the touch sensing performance may be improved. In contrast, according to the third to fifth touch scan manners SCAN3 to SCAN5, since switching between a display period (in detail, a sub display period) and a touch period (in detail, a sub touch period) is more in number than that of the first touch scan manner SCAN1 or the second touch scan manner SCAN2, power consumption and noise generation may increase.

The following table 1 shows scan types and touch scan operation frequencies of the first to fifth touch scan manners SCAN1 to SCAN5.

TABLE 1

| Touch scan type | Scan type | Scan frequency |
| --- | --- | --- |
| First touch scan manner (SCAN1) | VB type | f (vertical synchronization signal frequency) |
| Second touch scan manner (SCAN2) | VB type | f/2 |
| Third touch scan manner (SCAN3) | LHB type | f |
| Fourth touch scan manner (SCAN4) | LHB type | 2 * f |
| Fifth touch scan manner (SCAN5) | LHB type | f/2 |

Referring to table 1, the first and second touch scan manners SCAN1 and SCAN2 may be a VB type, and the third to fifth touch scan manners SCAN3 to SCAN5 may be an LHB type. In the case of the VB type, since the number of times of a switch between the display period and the touch period is small compared with the LHB type, power consumption may be relatively small, and noise generation may be relatively small. However, the touch sensing performance of the LHB type may be better than that of the VB type.

The third and fourth touch scan manners SCAN3 and SCAN4 have high touch scan frequencies compared with the second and fifth touch scan manners SCAN2 and SCAN5. That is, the touch sensing performance of the third and fourth touch scan manners SCAN3 and SCAN4 may be better than that of the second and fifth touch scan manners SCAN2 and SCAN5.

That is, the first, second, or fifth touch scan manner SCAN1, SCAN2, or SCAN5 in which power consumption and noise generation are relatively small may be used as the detection mode according to an example embodiment of inventive concepts. The third or fourth touch scan manner SCAN3 or SCAN4 in which touch sensing performance is relatively good may be used as the activation mode according to an example embodiment of inventive concepts.

However, the classification may be an example, and example embodiments of inventive concepts are not limited thereto. Any one of the first to fifth touch scan manners SCAN1 to SCAN5 may be used as the detection mode, and any one of the first to fifth touch scan manners SCAN1 to SCAN5 may be used as the activation mode.

In example embodiments, the first to fifth touch scan manners SCAN1 to SCAN5 are described with reference to FIGS. 5 to 8, but example embodiments are not be limited thereto. The touch scan manner according to an example embodiment of inventive concepts may be variously changed or modified.

Figure 9:
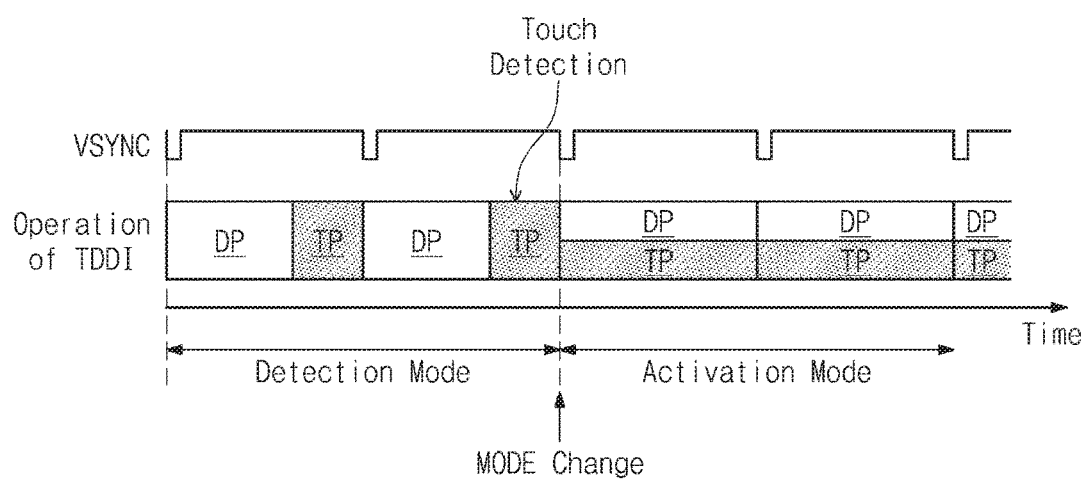
FIG. 9 is a timing diagram illustrating an operation of the TDDIC of FIG. 4.

FIG. 9 is a timing diagram illustrating an operation of the TDDIC 120 of FIG. 4. Referring to FIGS. 1 and 9, the TDDIC 120 may operate in a detection mode. In this case, it is assumed that the detection mode is a mode that operates according to the first touch scan manner SCAN1 described with reference to FIG. 6. However, example embodiments of inventive concepts are not limited thereto. As described with reference to FIG. 6, the TDDIC 120 may perform a display period DP and a touch period TP in synchronization with the vertical synchronization signal VSYNC.

A touch may be detected in the second touch period TP while operating in the detection mode. In this case, the TDDIC 120 may change an operation mode to the activation mode in response to the touch detection. In this case, it is assumed that the activation mode is a mode that operates according to the third touch scan manner SCAN3 described with reference to FIG. 7. However, example embodiments of inventive concepts are not limited thereto.

Afterwards, the TDDIC 120 may operate in the activation mode (i.e., operates based on the third touch scan manner SCAN3) to detect a touch. In example embodiments, information of the touch detected in the activation mode may be provided to an external device (e.g., CPU or AP), and the external device may perform the corresponding operation in response to the provided information.

Figure 10:
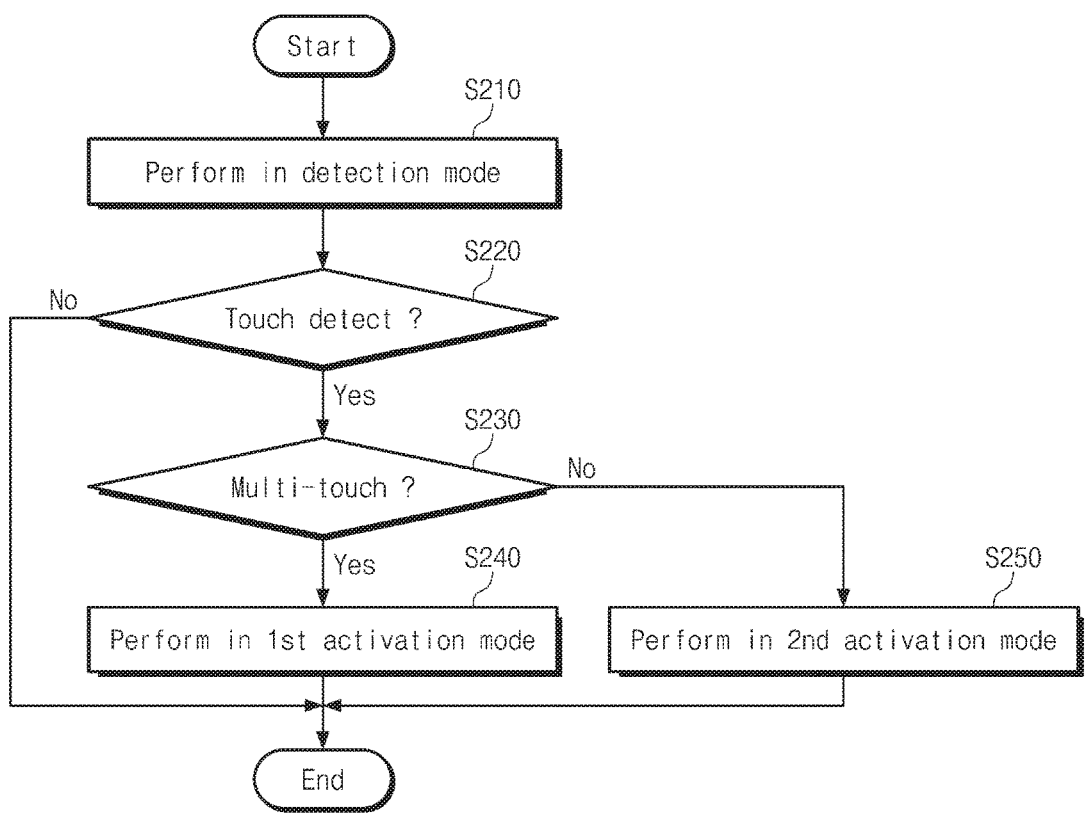
FIG. 10 is a flowchart illustrating an operation of the TDDIC of FIG. 1.

FIG. 10 is a flowchart illustrating an operation of the TDDIC 120 of FIG. 1. Referring to FIGS. 1 and 10, the TDDIC 120 may perform operation S210 and operation S220. Operation S210 and operation S220 may be similar to operation S110 and operation S120 of FIG. 4, and a detailed description thereof is thus omitted.

If a touch is detected, in operation S230, the TDDIC 120 may determine whether a sensed touch is a multi-touch. For example, the touch display device 100 may be configured to sense a multi-touch operation of the user. The multi-touch operation indicates a touch operation that is performed on a plurality of points (or a plurality of touch electrodes) at the same time.

If the detected touch is the multi-touch, in operation S240, the TDDIC 120 may operate in a first activation mode. If the detected touch is not the multi-touch, in operation S250, the TDDIC 120 may operate in a second activation mode. In example embodiments, that the multi-touch is sensed may mean that improvement of touch sensing performance is required in the following operation. That is, the first activation mode may be an operation mode of which touch sensing performance is higher than that of the second activation mode.

For example, in the example embodiment of FIG. 10, the detection mode may be a mode that operates based on the first touch scan manner SCAN1 of FIG. 6, the first activation mode may be a mode that operates based on the fourth touch scan manner SCAN4 of FIG. 8, and the second activation mode may be a mode that operates based on the third touch scan manner SCAN3 of FIG. 7.

That is, when a touch is not detected, the TDDIC 120 may operate in the detection mode based on the first touch scan manner SCAN1; when a detected touch is not a multi-touch, the TDDIC 120 may operate in the second activation mode based on the third touch scan manner SCAN3 of which touch sensing performance is higher than that of the first touch sensing manner SCAN1; when the detected touch is the multi-touch, the TDDIC 120 may operate based on the fourth touch scan manner SCAN4 of which touch sensing performance is higher than that of the third touch sensing manner SCAN3. Accordingly, power consumption may decrease while a touch is not occurred, and touch sensing performance may be improved by changing an operation mode based on whether a touch is generated.

Figure 11:
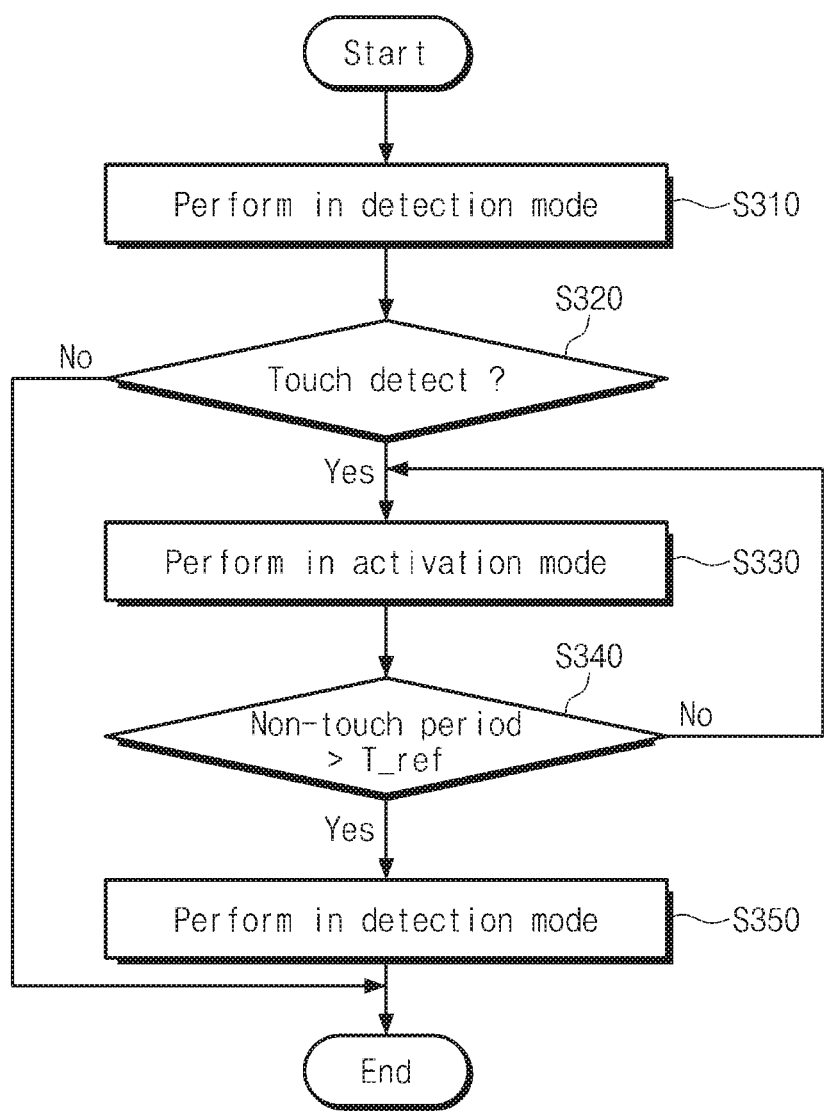
FIG. 11 is a flowchart illustrating an operation of the TDDIC of FIG. 1.

FIG. 11 is a flowchart illustrating an operation of the TDDIC 120 of FIG. 1. Referring to FIGS. 1 and 11, the TDDIC 120 may perform operation S310 to operation S330. Operation S310 to operation S330 may be similar to operation S110 to operation S130 of FIG. 4, and a detailed description thereof is thus omitted.

In operation S340, the TDDIC 120 may determine whether a non-touch period is larger than a reference time T_ref. If the non-touch period is not larger than the reference time T_ref (i.e., if a touch is detected within the reference time T_ref), the TDDIC 120 may operate in the activation mode.

If the non-touch period is larger than the reference time T_ref (i.e., if a touch is not detected within the reference time T_ref), in operation S350, the TDDIC 120 may operate in the detection mode.

As described above, when the TDDIC 120 detects a touch in the detection mode, the TDDIC 120 may operate in the activation mode. In this case, in the case where a touch is not detected during the reference time T_ref, the TDDIC 120 may change an operation mode into the detection mode and may operate.

Figure 12:
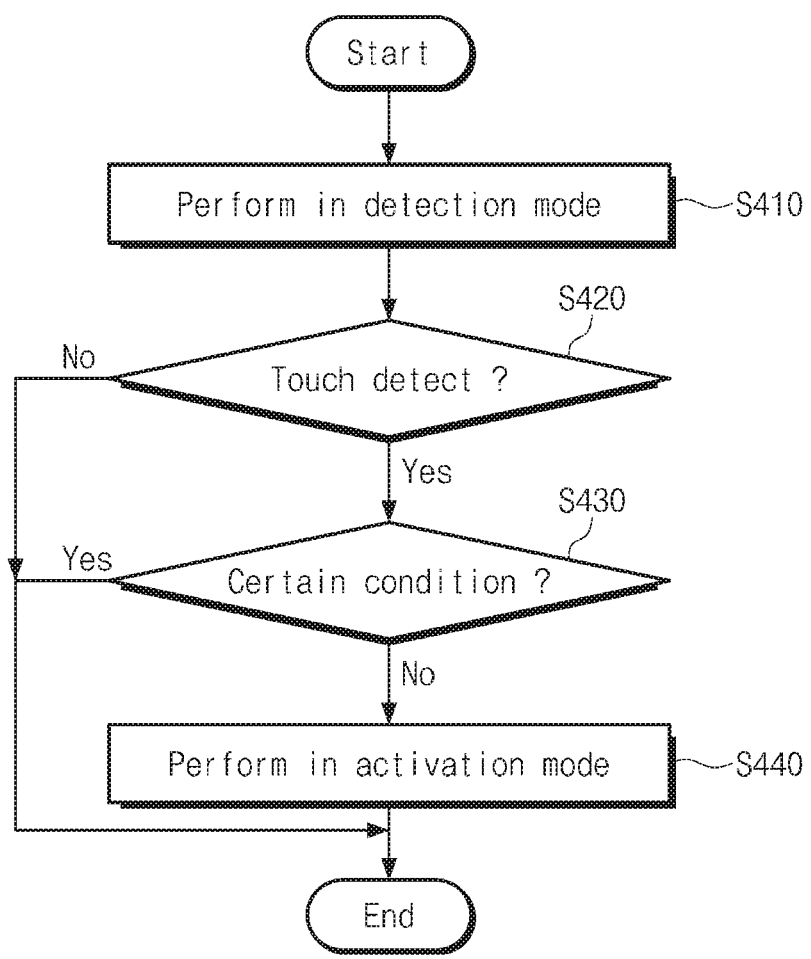
FIG. 12 is a flowchart illustrating an operation of the TDDIC of FIG. 1.

FIG. 12 is a flowchart illustrating an operation of the TDDIC 120 of FIG. 1. Referring to FIGS. 1 and 12, the TDDIC 120 may perform operation S410 and operation S420. Operation S410 and operation S420 may be similar to operation S110 and operation S120 of FIG. 4, and a detailed description thereof is thus omitted.

In operation S430, the TDDIC 120 may determine whether it is a specific condition state. If it is not the specific condition state, the TDDIC 120 may perform operation S440; if it is the specific condition state, the TDDIC 120 may not change an operation mode.

In example embodiments, the specific condition state may include various operation environment conditions such as the case where a specific application is performed, the case where touch detection is prevented by a request of the user, and the case of a low-power mode. For example, a low-power mode may be set in an electronic device in which the touch display device 100 is included. In this case, since a decrease in power consumption is put before any other condition in the electronic device, the TDDIC 120 may not change an operation mode even though a touch is detected. That is, even though a touch is detected, the TDDIC 120 may operate in the detection mode, thereby minimizing power consumption.

Alternatively, a specific application (e.g., a photo editor) may be executed in an electronic device in which the touch display device 100 is included. In this case, the quality of image thus displayed may be put before touch sensing performance. That is, even though a touch is detected, the TDDIC 120 may operate in the detection mode, thereby minimizing noise of the image.

In example embodiments, the TDDIC 120 may be configured to provide touch information to an external device (e.g., CPU or AP) in the detection mode associated with the above-described specific condition.

As described above, according to an example embodiment of inventive concepts, in the case where a touch is not detected, the TDDIC 120 may operate in the detection mode, thereby minimizing power consumption and noise generation. Also, in the case where a touch is detected, the TDDIC 120 may operate in the activation mode, thereby improving the touch sensing performance. Accordingly, a touch display device having improved performance and reduced power consumption is provided.

Figure 13:
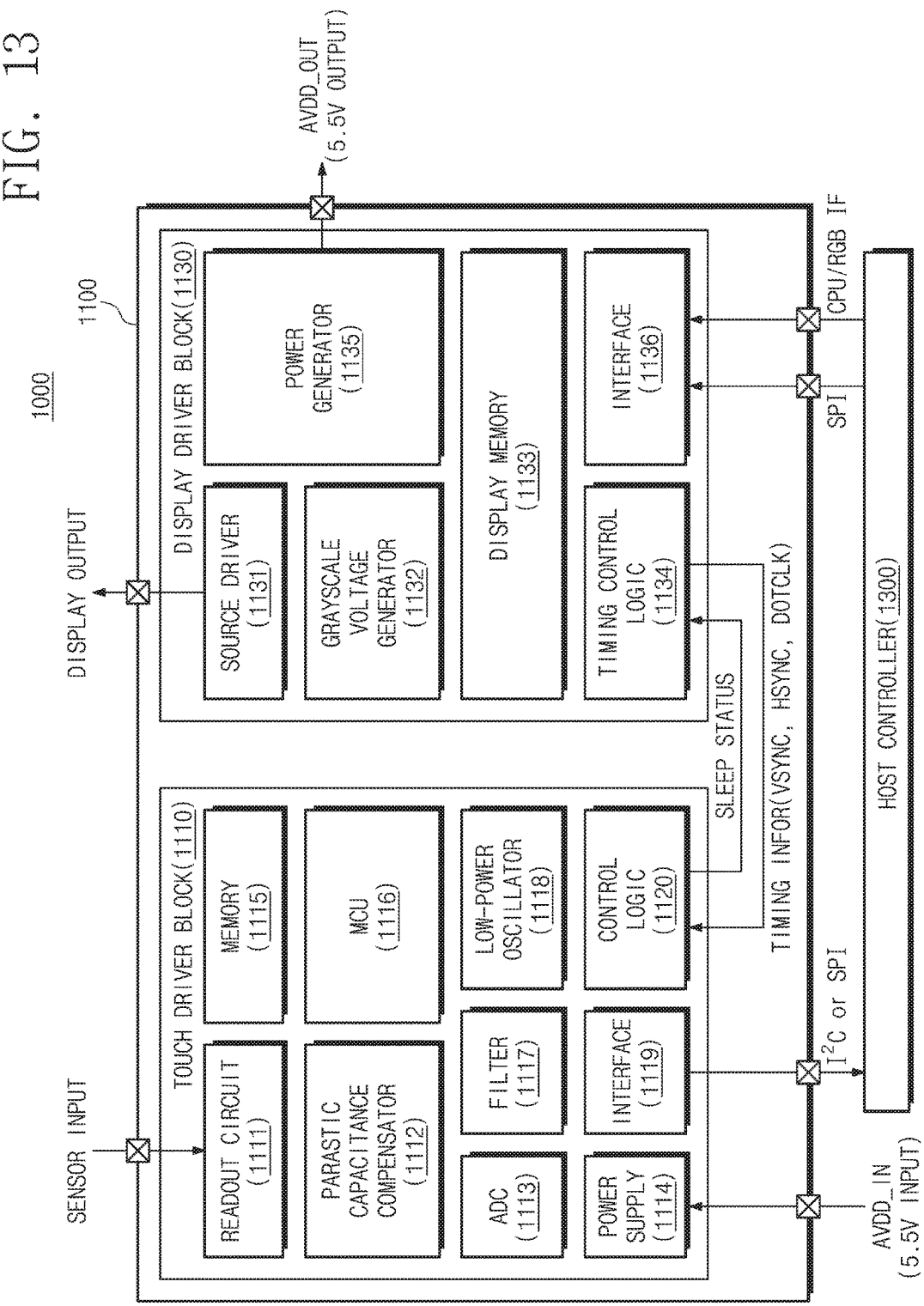
FIG. 13 is a block diagram illustrating an integrated circuit, according to an example embodiment of inventive concepts.

FIG. 13 is a block diagram illustrating an integrated circuit 1000, according to an example embodiment of inventive concepts. In example embodiments, the integrated circuit 1000 illustrated in FIG. 13 may be an example. The integrated circuit 1000 may further include any other component(s) as well as illustrated components or may exclude some of the illustrated components, based on an implementation manner of inventive concepts.

Referring to FIG. 13, the integrated circuit 1000 may include a TDDIC 1100 and a host controller 1300.

The TDDIC 1100 may operate based on the operation method described with reference to FIGS. 1 to 12. The TDDIC 1100 may include a touch driver block 1110 and a display driver block 1130. The touch driver block 1110 may operate as a touch driver. The display driver block 1130 may operate as a source driver (or a gate driver or a display driver).

In example embodiments, the touch driver block 1110 and the display driver block 1130 may be integrated in one semiconductor chip, one semiconductor die, or one semiconductor package. Also, in the case where the touch driver block 1110 and the display driver block 1130 are integrated in one device, influence due to noise during a touch scan operation may be reduced by synchronizing a sensing signal of the touch driver block 1110 and a signal of the display driver block 1130.

The touch driver block 1110 may include various components for a touch scan operation in a touch period. For example, the touch driver block 1110 may include a readout circuit 1111, a parasitic capacitance compensator 1112, an analog-to-digital converter (ADC) 1113, a power supply 1114, a memory 1115, a micro control unit (MCU) 1116, a filter 1117, a low-power oscillator 1118, an interface 1119, and control logic 1120.

The readout circuit 1111 may generate touch data through a sensor input. The compensator 1112 may reduce or compensate for a parasitic capacitance component of a touch display panel. The ADC 1113 may convert analog data into a digital signal. The power supply 1114 may receive an input voltage AVDD_IN and may generate a power supply voltage based on the received input voltage AVDD_IN. The memory 1115 may be implemented to temporarily store generated touch data. The filter 1117 may be a digital FIR low-pass filter providing digital filtering. The low-power oscillator 1118 may generate a low-power oscillation signal. The interface 1119 may be configured to transmit and receive signals to and from the host controller 1300. In example embodiments, the interface 1119 may be an I²C or SPI interface.

The display driver block 1130 may include various components for a display operation in a display period. For example, the display driver block 1130 may include a source driver 1131, a grayscale voltage generator 1132, a display memory 1133, timing control logic 1134, a power generator 1135, and an interface 1136.

The source driver 1131 may be configured to output a display output. In example embodiments, the display output may be provided to each of a plurality of pixels through a data line. The grayscale voltage generator 1132 may provide various grayscale voltages for generating grayscale data to the source driver 1131. The display memory 1133 may be implemented to temporarily store display data. The timing control logic 1134 may be configured to generate or control various control signals. The interface 1136 may provide a CPU interface or an RGB interface for communication with the host controller 1300.

The touch driver block 1110 may be configured to receive at least one timing information (e.g., VSYNC, HSYNC, and DOTCLK) from the display driver block 1130. For example, the control logic 1120 of the touch driver block 1110 may be configured to receive various timing information (e.g., VSYNC, HSYNC, and DOTCLK) synchronized with the display output from the timing control logic 1134 of the display driver block 1130. The control logic 1120 may generate various control signals such that a touch scan operation is performed based on the received timing information.

In example embodiments, the control logic 1120 may generate various control signals such that the detection mode, the activation mode, or the various touch scan manners described with reference to FIGS. 1 to 12 are performed based on the received timing information.

In example embodiments, the display driver block 1130 may receive at least one information from the touch driver block 1110. For example, the display driver block 1130 may receive a sleep status signal SLEEP STATUS from the touch driver block 1110. The display driver block 1130 may perform the corresponding operation in response to the received sleep status signal SLEEP STATUS. For example, the sleep status signal SLEEP STATUS may indicate that the touch driver block 1110 is in a sleep status since a touch is not sensed. In this case, the display driver block 1130 may not provide all or part of the timing information to the touch driver block 1110. As such, power consumption of the integrated circuit 1000 may decrease.

In example embodiments, the sleep status signal SLEEP STATUS may mean that the touch driver block 1110 operates in the detection mode described with reference to FIGS. 1 to 12. In this case, the display driver block 1130 may be configured to provide only information (e.g., VSYNC) needed for the touch driver block 1110 to operate in the detection mode.

In example embodiments, each of the touch driver block 1110 and the display driver block 1130 may include a circuit block that generates power, a memory that stores data, a control unit that controls functions of the blocks, etc. As such, in the case where the touch driver block 1110 and the display driver block 1130 are integrated in one semiconductor chip, a memory, a power generator, control logic, etc. may be implemented to be shared by the touch driver block 1110 and the display driver block 1130.

Figure 14:
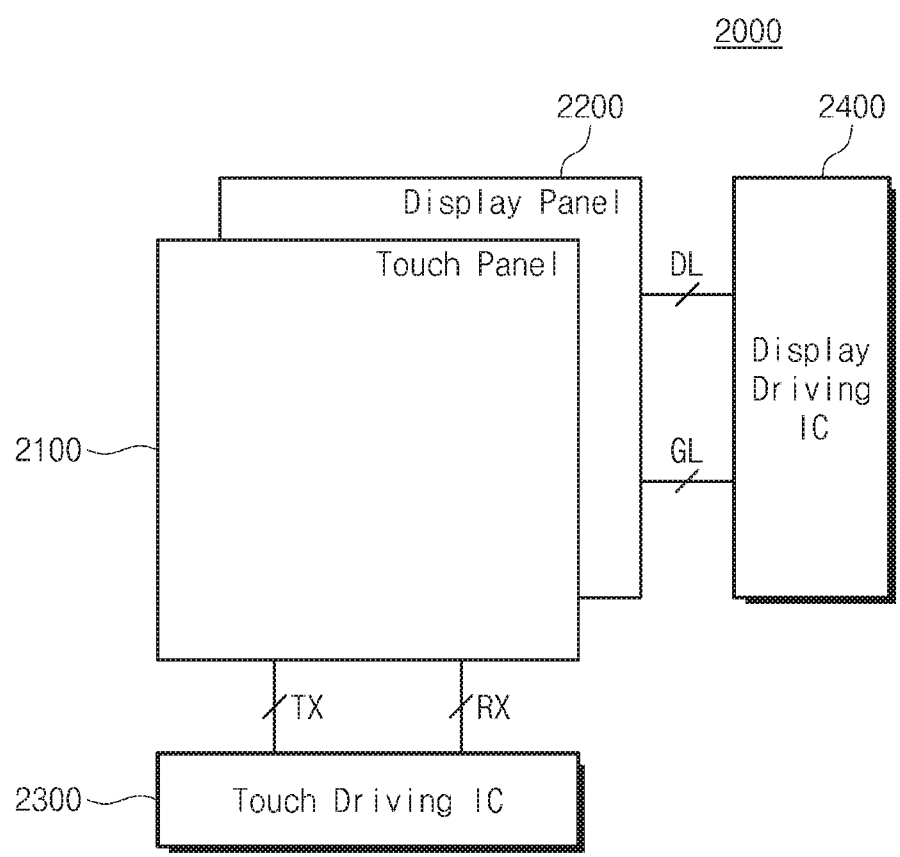
FIG. 14 is a block diagram illustrating a touch display device, according to an example embodiment of inventive concepts.

FIG. 14 is a block diagram illustrating a touch display device 2000, according to an example embodiment of inventive concepts. For a brief description, components that are similar to the above-described components or duplicated components are not described.

Referring to FIG. 14, the touch display device 2000 may include a touch panel 2100, a display panel 2200, a touch driving circuit 2300, and a display driving circuit 2400. Unlike the touch display device 100 of FIG. 1, the touch display device 2000 of FIG. 14 may be implemented in an on-cell or out-cell form. That is, the touch panel 2100 and the display panel 2200 may be implemented on different substrates, or the touch panel 2100 may be formed on the display panel 2200. In this case, the touch panel 2100 and the display panel 2200 may be configured to operate independently of each other.

The touch driving circuit 2300 may be connected with the touch panel 2100 through a plurality of transmission lines TX and a plurality of reception lines RX. The touch driving circuit 2300 may provide a touch sensing signal through the plurality of transmission lines TX and may receive the touch sensing signal through the plurality of reception lines RX. The touch driving circuit 2300 may sense a touch based on a change in the touch sensing signal received through the plurality of reception lines LX. That is, the touch driving circuit 2300 may be configured to perform an operation similar (or the same operation) to the touch scan operation of the TDDIC 120 described with reference to FIGS. 1 to 12.

The display driving circuit 2400 may be connected with the display panel 2200 through a plurality of data lines DL and a plurality of gate lines GL. The display driving circuit 2400 may allow image information to be displayed on the display panel 2200 by providing data signals to the display panel through the plurality of data lines DL and controlling the plurality of gate lines GL. That is, the display driving circuit 2400 may be configured to perform an operation similar (or the same operation) to the display operation of the TDDIC 120 described with reference to FIGS. 1 to 12.

In example embodiments, the touch driving circuit 2300 and the display driving circuit 2400 may be integrated in one semiconductor chip, one semiconductor die, or one semiconductor package. Alternatively, the touch driving circuit 2300 and the display driving circuit 2400 may be integrated in different semiconductor chips, different semiconductor dies, or different semiconductor packages.

As described with reference to FIGS. 1 to 12, the touch driving circuit 2300 may be implemented to operate in the detection mode when a touch is not sensed and to operate in the activation mode when a touch is sensed.

Figure 15:
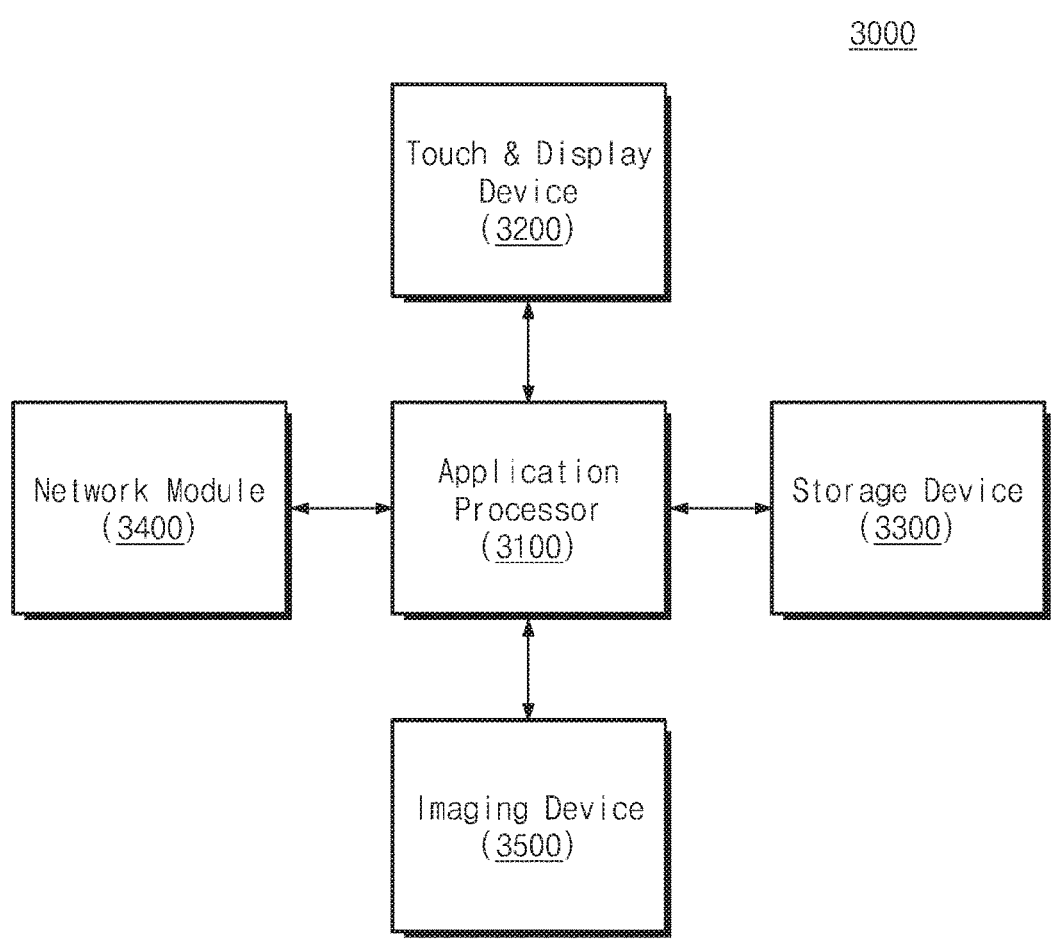
FIG. 15 is a block diagram illustrating a user device to which the touch display panel is applied, according to an example embodiment of inventive concepts.

FIG. 15 is a block diagram illustrating a user device 3000 to which a touch display panel is applied, according to an example embodiment of inventive concepts. Referring to FIG. 15, the user device 3000 may include an application processor 3100, a touch and display device 3200, a storage device 3300, an imaging device 3500, and a network module 3400. In example embodiments, the user device 3000 may be one of computing systems such as a ultra-mobile PC (UMPC), a workstation, a net-book, personal digital assistants (PDA), a portable computer, a web tablet, a wireless phone, a mobile phone, a smartphone, e-book, a portable multimedia player (PMP), a portable game player, a navigation device, a black box, a digital camera, a digital multimedia broadcasting (DMB) player, a digital audio recorder, a digital audio player, a digital picture recorder, a digital picture player, a digital video recorder, and a digital video player.

The application processor 3100 may control overall operations of the user device 3000. The application processor 3100 may drive components, an operating system, various applications, etc. of the user device 3000. The application processor 3100 may include a graphics engine, controllers to control components included in the user device 3000, interfaces, or system memories such as a dynamic random access memory (DRAM) and a static RAM (SRAM).

The touch and display device 3200 may be configured to display image information or sense a touch, under control of the application processor 3100. The touch and display device 3200 may be the touch and display device 3200 described with reference to FIGS. 1 to 14 and may operate according to the operation method described with reference to FIGS. 1 to 14.

In example embodiments, touch information detected when the touch and display device 3200 operates in the detection mode may not be provided to the application processor 3100. That is, in the case where the touch and display device 3200 operates in the detection mode, the touch and display device 3200 may detect a touch to change an operation mode (e.g., a switch from the detection mode to the activation mode), and the application processor 3100 may control the touch and display device 3200 for an image output and may not receive touch information.

In contrast, touch information detected when the touch and display device 3200 operates in the activation mode may be provided to the application processor 3100. The application processor 3100 may be configured to perform the corresponding operation (e.g., a screen change, screen reduction/magnification, and app execution) in response to the received touch information.

The storage device 3300 may be configured to store data needed for the user device 3000 to operate or data generated during an operation. The storage device 3300 may be implemented with high-capacity semiconductor memory devices such as a DRAM, a synchronous DRAM (SDRAM), an SRAM, a double date rate (DDR) synchronous DRAM (SDRAM), DDR2 SDRAM, DDR3 SDRAM, a phase-change RAM(PRAM), a magnetic RAM (MRAM), a resistive RAM (RRAM), a NAND flash memory, and a NOR flash memory or a high-capacity magnetic disk device such as a hard disk drive (HDD)

The imaging device 3500 may be an image acquisition device, which is configured to capture an exterior view to acquire image data, such as an image sensor, an image sensor module, a video camera, a camera for surveillance, and a digital camera.

The network module 3400 may communicate with external devices. In example embodiments, the network module 3400 may support wireless communications, such as code division multiple access (CDMA), global system for mobile communication (GSM), wideband CDMA (WCDMA), CDMA-2000, time division multiple access (TDMA), long term evolution (LTE), Wimax, WLAN, UWB, Bluetooth, and WI-DI or wired communications.

According to the above-described example embodiments of inventive concepts, a touch and display device may operate in a detection mode when a touch is not detected and in an activation mode when a touch is detected. In this case, the detection mode may be advantageous in terms of low power consumption and low noise generation compared with the activation mode, and the activation mode may be advantageous in terms of improved touch sensing performance compared with the detection mode. Accordingly, the touch and display device according to an example embodiment of inventive concepts may minimize power consumption and noise generation by operating in the detection mode when a touch is not detected and may improve touch sensing performance by operating in the activation mode when a touch is detected. Accordingly, a touch and display device having improved performance and reduced power consumption is provided.

Example embodiments of inventive concepts may include a touch display driving integrated circuit (TDDIC) that converts an operation mode based on whether a touch of a user is detected. According to an example embodiment of inventive concepts, when a touch of the user is not detected, the TDDIC may operate in a detection mode, thereby reducing power consumption and noise generation. When a touch of the user is detected, the TDDIC may operate in an activation mode, thereby improving touch sensing performance. Accordingly, a touch display driving integrated circuit having improved performance and reduced power consumption and an operation method thereof are provided.

While example embodiments of inventive concepts have been described with reference to embodiments, it will be apparent to those skilled in the art that various changes and modifications may be made without departing from the spirit and scope of inventive concepts. Therefore, it should be understood that the above example embodiments are not limiting, but illustrative.

What is claimed is:

1. A touch display driving integrated circuit configured to control a touch display panel, comprising:
   a touch driving circuit configured to perform a touch scan operation on the touch display panel; and
   a display driving circuit configured to perform a display operation on the touch display panel,
   wherein the touch driving circuit is configured to,
   operate in a first operation mode having a first touch scan frequency; and
   operate in a second operation mode having a second touch scan frequency different from the first touch scan frequency when a first touch is detected from the touch display panel in the first operation mode.
   wherein the touch driving circuit performs the touch scan operation in a vertical blank period of a first cycle of a vertical synchronization signal in the first operation mode.

2. The touch display driving integrated circuit of claim 1, wherein each of the first and second touch scan frequencies indicates a number of times the touch scan operation is performed per second on touch electrodes in the touch display panel.

3. The touch display driving integrated circuit of claim 1, wherein the second touch scan frequency is higher than the first touch scan frequency.

4. The touch display driving integrated circuit of claim 1, wherein the touch driving circuit performs the touch scan operation during the first cycle of the vertical synchronization signal in the second operation mode, and the display driving circuit performs the display operation during the first cycle of the vertical synchronization signal in the second operation mode,
   wherein the display operation includes a plurality of sub display operations and the touch scan operation includes a plurality of sub touch scan operations,
   wherein the touch driving circuit and the display driving circuit are configured to alternately perform the plurality of sub display operations and the plurality of sub touch scan operations in the second operation mode.

5. The touch display driving integrated circuit of claim 4, wherein each of the plurality of sub display operations is associated with some of pixels in the touch display panel, and
   wherein each of the plurality of sub touch scan operations is associated with some of touch electrodes in the touch display panel.

6. The touch display driving integrated circuit of claim 1, wherein the touch driving circuit is configured to not provide information of the first touch to an external device while operating in the first operation mode and the touch driving circuit is configured to provide information of a second touch to the external device while operating in the second operation mode.

7. The touch display driving integrated circuit of claim 1, wherein the touch driving circuit is configured to operate in the first operation mode when a second touch is not detected during a reference time while operating in the second operation mode.

8. The touch display driving integrated circuit of claim 1, wherein the touch driving circuit is configured to operate in the second operation mode when the detected touch is not a multi-touch and to operate in a third operation mode when the detected touch is a multi-touch, the third operation mode having a third touch scan frequency higher than the second touch scan frequency.

9. The touch display driving integrated circuit of claim 1, wherein the touch display panel is an in-cell type touch display panel.

10. A method of operating a touch display driving integrated circuit configured to control a touch display panel, the method comprising:
    operating in a first operation mode, the operating in the first operation mode including,
       performing a touch scan operation in a vertical blank period of a vertical synchronization signal, and
       detecting a touch in the first operation mode; and
    operating in a second operation mode, the operating in the second operation mode including,
       alternately performing a plurality of sub display operations and a plurality of sub touch scan operations during a cycle of the vertical synchronization signal, in response to the detected touch.

11. The method of claim 10, wherein each of the plurality of sub display operations is associated with some of pixels in the touch display panel, and
    each of the plurality of sub touch scan operations is associated with some of touch electrodes in the touch display panel.

12. The method of claim 10, wherein a touch scan frequency of the first operation mode is lower than a touch scan frequency of the second operation mode.

13. The method of claim 12, wherein each of the touch scan frequencies of the first and second operation modes indicates a number of times of the touch scan operation is performed per second on touch electrodes in the touch display panel.

14. The method of claim 10, further comprising:
    operating in the first operation mode when a touch is not detected during a reference time while operating in the second operation mode.

15. A touch display device comprising:
    a display panel having a plurality of pixels and a plurality of touch electrodes; and
    a driving integrated circuit configured to operate in a first touch scan mode having a first touch scan frequency to detect a touch of a user in the first touch scan mode,
    wherein the driving integrated circuit is further configured to operate in a second touch scan mode when the detected touch is not a multi-touch and operate to in a third touch scan mode when the detected touch is a multi-touch, the second touch scan mode having a second touch scan frequency higher than the first touch scan frequency and the third touch scan mode having a third scan frequency higher than the second touch scan frequency.

16. The touch display device of claim 15, wherein the display panel is an in-cell touch display panel.

17. The touch display device of claim 16, wherein the driving integrated circuit is configured to perform a display operation during one display period and perform a touch operation during one touch period after performing the one display period in the first touch scan mode, the one display period and the one touch period being equal to or less than one frame length, the driving integrated circuit configured to perform the display operation over a plurality of display sub-periods and perform the touch operation over a plurality of touch sub-periods, the plurality of display sub-periods and the plurality of touch sub-periods being intermingled, and the frame length is a period of a vertical synchronization signal.

18. The touch display device of claim 17, wherein driving integrated circuit is configured to apply a common voltage to the touch electrodes to perform the display operation based on the common voltage and apply a touch sensing signal to detect the touch based on the touch sensing signal.

19. The touch display device of claim 15, wherein the driving integrated circuit is configured to perform the touch operation in every other frame.

20. The touch display driving integrated circuit of claim 1, wherein if the touch driving circuit is operated under a specific condition state, the touch driving circuit is configured to perform the touch scan operation based on the first operation mode regardless of detecting the first touch in the first operation mode, and the specific condition state includes at least one of a state performing a specific application, a state preventing a touch-detection, or a low-power state.

* * * * *